UNITED STATES PATENT OFFICE.

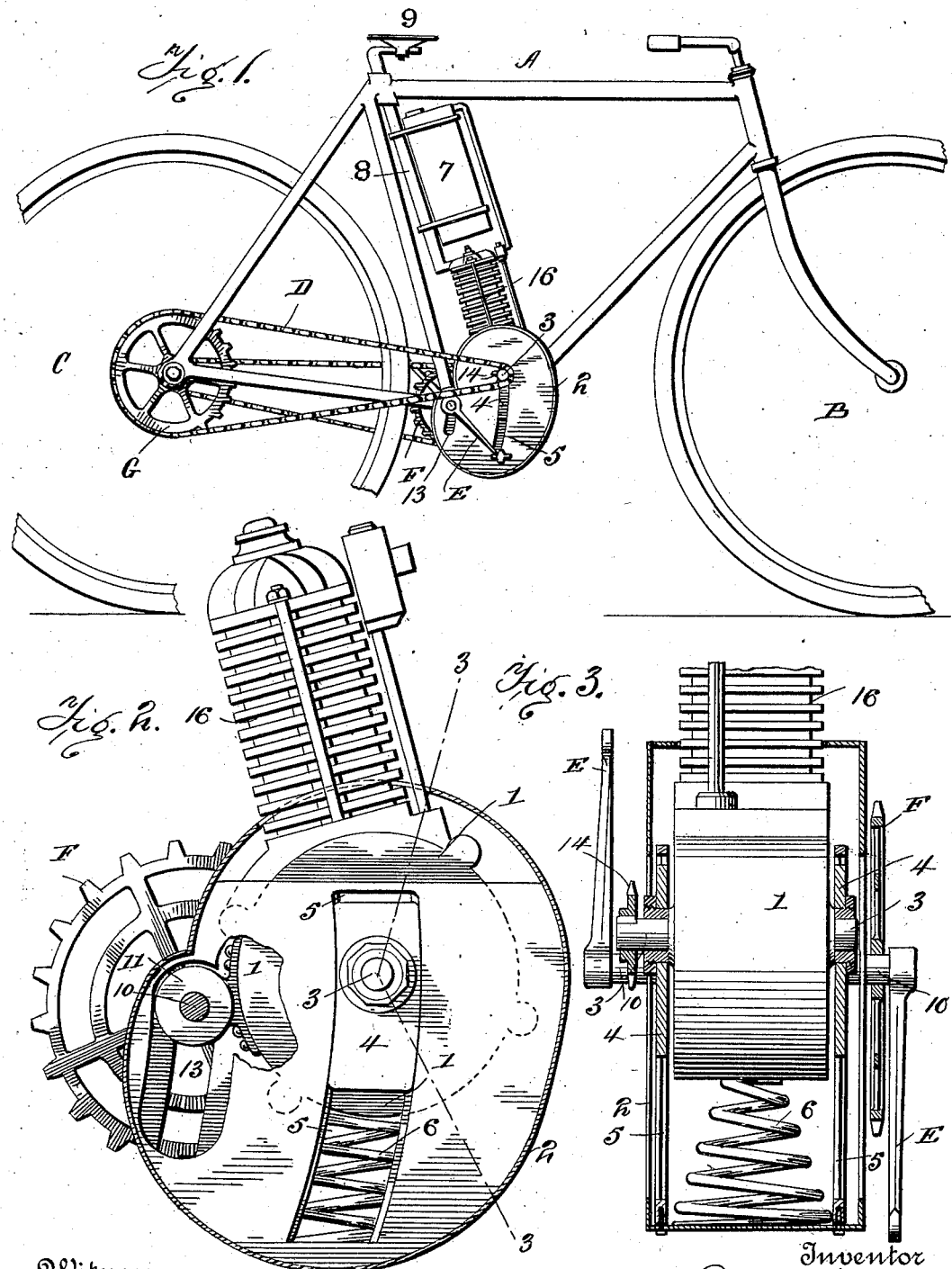

EDWARD Y. WHITE, OF SAN ANTONIO, TEXAS.

MOTOR-BICYCLE.

SPECIFICATION forming part of Letters Patent No. 670,010, dated March 19, 1901.

Application filed August 13, 1900. Serial No. 26,771. (No model.)

*To all whom it may concern:*

Be it known that I, EDWARD Y. WHITE, residing at San Antonio, in the county of Bexar and State of Texas, have invented certain new and useful Improvements in Motor-Bicycles, of which the following is a specification, reference being had therein to the accompanying drawings.

This invention relates to motor-bicycles.

The object of the invention is to produce a bicycle having a pedal driving-gear and a power-motor in which the motor, pedal-gear, and a saddle are all supported on a spring which permits yielding independently of the yielding of the pneumatic hubs or wheel-tires where such are employed.

Figure 1 is a broken side elevation of the main parts of a bicycle according to this invention, non-essential parts being generally omitted. Fig. 2 is a broken section and partial elevation of the motor and pedal-gear connected thereto. Fig. 3 is a section on line 3 3, Fig. 2.

The frame A is preferably the ordinary "diamond" frame, having the steering-wheel B and driving-wheel C of usual construction. The driving-wheel C is driven by the usual sprocket-chain D from the pedals E, the pedal-sprocket F being in usual relation to the driving-wheel and its driving-sprocket G. The driving-wheel is controlled in its movement by the pedals by means of a back-pedaling brake or wheel-controlling mechanism of usual construction, the same being no part of the present invention.

The motor 1 may be of any known form of gasolene or other engine. This motor-engine is inclosed within a casing 2. The engine has its shaft 3 supported in bearings 4, which bearings are guided in curved slots 5 in casing 2, these curved slots being struck on arcs about the center of sprocket G.

The motor 1 is supported by spring 6 within the motor-casing and arranged to sustain the whole weight of the motor and its ignition-battery 16, as well as the feed-tank 7, the saddle-post 8, and saddle 9. The saddle-post 8 moves freely in vertical direction in frame A and loosely enough to permit the slight change of angle due to the curved guides or slots 5 in the casing.

The pedal-shaft 10 passes through bearing 11, which bearing is firmly connected to the motor 1, preferably by screws or other detachable means. The bearing 11 will then partake of the vertical movement of the motor-engine, and the saddle and the pedals will maintain the same relation to each other, although these parts will be by the spring relieved in great measure from the vibrations which affect the position of the frame when the bicycle is in use.

The casing 2 is preferably of a form to inclose the main part of the motor-engine and also the pedal shaft and bearings. The casing is slotted at 13 to permit the vertical or approximately vertical movement of the pedal mechanism.

The pedal-shaft bearing might be supported by a pneumatic spring, as in my Patent No. 641,914 of January 23, 1900, or such a spring might be substituted for the spring 6, as illustrated, under some circumstances of construction. For most purposes, however, I prefer a steel spring made in the form of a frustum of a cone, so that the coils when depressed or compressed close one within the other, giving all the time an elastic support without actual solid contact of the coils of the spring.

The driving-sprocket 14 on the engine-shaft is connected to sprocket G on the drive-wheel by a sprocket-chain. The sprocket on the driver is preferably much larger than the sprocket on the engine, so that the speed of the engine will be reduced on the drive-wheel axle, and the reverse arrangement of gears will generally be adopted from the pedal-sprocket, as is common in motor-cycles. A great advantage of this construction is that the motor-engine is relieved from the vibrations which affect the frame of the machine, and that the motor-power, whether the same be the muscular power of the rider or the power of the engine, has a uniform relation to the drive-wheel. As the pedals control the application of the motor-power to the drive-wheel, as usual in back-pedaling brakes and controlling devices, the intimate relation of the pedaling device and the motor-engine becomes apparent.

I have not attempted to describe specifically the engine employed, as such engine may be any one of several engines known in this art.

An essential feature of the invention is that the engine shall be permitted to have substantially vertical movement independently of the frame and still maintain its steady driving relation to the driving-wheel, which wheel in the construction shown partakes of the frame movement. The use of pneumatic hubs would modify the relations of parts to some extent, but such modification I believe to be within the knowledge of skilled mechanics without further invention.

What I claim is—

1. In a bicycle, the combination of a motor-engine and pedal driving mechanism secured together to partake of vertical movement, and connected to the driving-wheel, and a spring interposed between the engine and the frame so that the engine and pedal are relieved from vibrations of the frame by the interposed spring, substantially as described.

2. In a bicycle, the combination with the seat-post and saddle, of a motor-engine rigidly secured to the seat-post, and a spring interposed between the engine and frame, so that the engine and saddle may have vertical movement independently of the frame, substantially as described.

3. In a bicycle, the combination of the seat-post and saddle, a motor-engine rigidly secured thereto, a pedal-gear secured to the engine, and a supporting-spring interposed between the above elements and the frame, so that the engine, saddle, and pedals may together have vertical movement independently of the frame, substantially as described.

4. In a bicycle, the combination of a motor-engine, an inclosing casing supported by the frame and having substantially vertical slots therein, the shaft of the engine passing through such slots, a spring interposed between the engine and casing, and driving mechanism connecting the engine-shaft to the drive-wheel outside the casing, all substantially as described.

5. In a bicycle, the combination of the frame, a casing connected thereto, a motor-engine and pedal-gear mainly within the casing and having shafts projecting from said casing through curved slots, a spring supporting said engine and pedal, and separate driving means connecting the motor-shaft and pedal-shaft to the drive-wheel, all substantially as described.

6. In a bicycle, the combination of the frame, a casing fixed thereto, a motor-engine mainly within the casing and having its shaft projecting through slots in the casing, a spring between the engine and casing, and a sprocket-wheel outside the casing and connected by a chain to a sprocket on the drive-wheel, all substantially as described.

7. In a bicycle, the combination of the frame, a casing fixed thereto and having separate end slots, a motor-engine mainly within the casing and having its shaft projecting from slots in the casing, a pedal-bearing within the casing and secured to the engine, a spring supporting the engine and pedal-bearing to move independently of the casing, a pedal-shaft projecting from slots in the casing, a driving-sprocket on the engine-shaft at one side of the casing, and a driving-sprocket on the pedal-shaft at the other side of the casing, and driving-chains extending from both said sprockets to the drive-wheel, all substantially as described.

In testimony whereof I affix my signature in presence of two witnesses.

EDWARD Y. WHITE.

Witnesses:
GEORGE PANCOAST,
TOM LODOVIC.